United States Patent [19]

Fleischer et al.

[11] Patent Number: 5,256,733
[45] Date of Patent: Oct. 26, 1993

[54] THERMOPLASTIC POLYOXYMETHYLENE MOLDING COMPOSITION OF HIGH TOUGHNESS AND ITS USE

[75] Inventors: Dietrich Fleischer, Darmstadt; Helmut Schlaf, Kelkheim (Taunus), both of Fed. Rep. of Germany

[73] Assignee: Hoechst Aktiengesellschaft, Frankfurt, Fed. Rep. of Germany

[21] Appl. No.: 741,359

[22] Filed: Aug. 7, 1991

[30] Foreign Application Priority Data

Aug. 9, 1990 [DE] Fed. Rep. of Germany ....... 4025219

[51] Int. Cl.[5] ..................... C08L 59/02; C08L 59/04; C08L 51/04
[52] U.S. Cl. ..................................... 525/64; 525/902; 525/69
[58] Field of Search ............................. 525/64, 69, 902

[56] References Cited

U.S. PATENT DOCUMENTS 4,639,488  1/1987  Schuette et al. ...................... 525/64

FOREIGN PATENT DOCUMENTS 0156285 10/1985 European Pat. Off. .
0181541  5/1986 European Pat. Off. .
0390146 10/1990 European Pat. Off. .

*Primary Examiner*—James J. Seidleck
*Assistant Examiner*—W. R. H. Clark
*Attorney, Agent, or Firm*—Connolly and Hutz

[57] ABSTRACT

Thermoplastic molding composition composed of A) 50 to 95% by weight of polyoxymethylene, B) 5 to 50% by weight of a rubber-elastic graft copolymer and optionally customary additives, in which the component B) is composed of a rubber-elastic core based on at least one polydiene, which is at least partially crosslinked, and at least one hard graft shell and has a bimodal particle size distribution. Monomers for formation of the graft shell are styrene, (meth)acrylonitrile and/or methyl methacrylate. The moldings produced from the molding compositions possess good tough fracture characteristics even at low temperatures.

20 Claims, No Drawings

THERMOPLASTIC POLYOXYMETHYLENE MOLDING COMPOSITION OF HIGH TOUGHNESS AND ITS USE

The invention relates to thermoplastic polyoxymethylene molding compositions of high toughness and their use for the production of moldings.

Polyacetals have long been employed as versatile materials, in particular in the industrial field. Because of their outstanding mechanical properties, such as high rigidity, hardness and strength, and also the possibility for producing preforms and moldings within narrow tolerance limits, and the good resistance to many chemicals,, they are frequently suitable as replacements for metals. However, because of their relatively high glass transition temperature, they have too low an impact strength, and in particular too low a multiaxial impact strength, for a number of applications. For fields of application of this type it is additionally desirable that the products retain their good impact strength characteristics even at low ambient temperatures.

A number of methods are known for improving the toughness of partially crystalline thermoplastically moldable polymers by incorporation of crosslinked or non-crosslinked elastomers, some of which are also graft elastomers. The following modifications have been described using polyoxymethylene: a polyoxymethylene modified with polyurethane (DE-B 1 193 240); a polyoxymethylene modified with a two-phase mixture of polybutadiene and styrene/acrylonitrile (ABS) (DE-B 1 931 392); a polyoxymethylene modified with a graft copolymer prepared on the basis of acrylate/butadiene (DE-C 1 964 156); a polyoxymethylene modified with a polydiene/polyalkylene oxide block polymer (DE-A 2 408 487) and, finally, a polyoxymethylene finished with modified polysiloxanes or silicone rubbers (DE-A 2 659 357). In addition, graft diene rubbers which have a specific graft structure have been proposed for polyoxymethylene (EP-A 0 156 285). The said mixtures generally have improved toughness parameters at room temperature; in particular the cold notched impact strength is substantially increased in the case of the mixtures of DE-A 2 659 357 and EP-A 0 156 285.

However, it has been found that molding compositions of this type do not always have completely satisfactory property profiles for important applications in which high deformation forces have to be absorbed; in particular if low temperatures down to −30° C. or even down to −40° C. are employed.

EP-A 0 037 686 discloses impact-resistant blends of hard thermoplastics, a rubber-elastic elastomer and a component which promotes the dispersion of the elastomer in the plastic matrix. The elastomer components are graft copolymers having a core-and-shell structure, for example polybutadiene grafted with styrene and methyl methacrylate (MBS) or with styrene/acrylonitrile (ABS). Polyoxymethylene is not mentioned as a polymer matrix in this literature reference. The same is also the case for EP-A 0 079 477, which relates to molding compositions having improved low temperature impact strength and obtained from polyesters and an impact-resistant component, inter alia having a core-and-shell structure. The shell of the particles of the impact-resistant component can be built up from several layers of different material composition. The impact-resistant component contains, inter alia, polycarbonate as essential constituent.

The object of the present invention was, therefore, to provide impact-resistant modified polyoxymethylene which, at temperatures down to about −40° C., has toughness parameters in the multiaxial impact penetration test which are considerably improved compared with those of known systems, without the original advantageous properties of the polyoxymethylene, such as good resistance to weathering and to aging, good surface quality and advantageous thermoplastic processability, being substantially impaired as a result. It was also desired to use inexpensive, halogen-free impact-resistant components.

It has been found that this object can be achieved by using, as impact-resistant component,, graft copolymers comprising a rubber-elastic single-phase core based on polydiene having a bimodal particle size distribution and a hard graft shell (core-and-shell structure).

The invention therefore relates to thermoplastic molding compositions comprising A. 50 to 95% by weight of polyoxymethylene, and
B. 5 to 50% by weight of a rubber-elastic graft copolymer, in each case based on the sum of the components A) and B), and optionally conventional additives, component B) comprising a rubber-elastic, at least partially crosslinked core based on at least one polydiene having particle diameters of 0.05 to 1 μm and at least one hard graft shell comprising at least one vinyl monomer selected from the group comprising styrene, (meth)acrylonitrile and methyl methacrylate, and the graft product B) having bimodal particle size distribution.

As mentioned, the primary particles of the graft copolymer B) are in bimodal distribution in the polyoxymethylene matrix.

Combinations of styrene/acrylonitrile or styrene and methyl methacrylate are preferred for the graft shell. The particle diameter range of the polydiene core is in general 0.05 to 1 μm, preferably 0.06 to 0.8 μm.

Component B) is built up on the basis of the following rubbers:

a) 15–85, preferably 30–70 and in particular 35–60, % by weight (based on the sum of a+b) of a rubber latex having an average particle diameter $d_{50}$ of 0.05–0.2, preferably 0.08–0.15 μm, and b) 85–15, preferably 70–30 and in particular 65–35, % by weight (based on the sum of a+b) of a rubber latex having an average particle diameter $d_{50}$ of 0.2–1, preferably 0.25–0.8 and in particular 0.3–0.6 μm, with the proviso that $d_{50}$ of (b) is larger than $d_{50}$ of (a) by a factor of 1.5–8, preferably 2.7–5 and in particular 3–4.5, the quotient $Q=(d_{90}-d_{10})/d_{50}$ of the individual rubbers is in each case at most 2, preferably at most 1.8 and in particular at most 0.8, and the difference $d_{10}(b)$ minus $d_{90}(a)$ is 0.01 to minus 0.10, preferably zero to minus 0.08 and in particular zero to minus 0.05.

The weight data for the rubber latices a) and b) are in each case based on solid.

In order to prepare the graft product B) it is possible either to mix a rubber latex corresponding to a) and a rubber latex corresponding to b) in the indicated proportions and to graft-polymerize the vinyl monomers onto this mixture, or to graft-polymerize the vinyl monomers onto a rubber latex corresponding to a) and onto a rubber latex corresponding to b) separately from one another and to mix the two graft products (either in the form of latices with subsequent common precipitation or in the form of already existing solids).

The molding compositions according to the invention are more suitable than known molding compositions for the abovementioned applications; in addition, they have no significant disadvantages.

It is essential to use at least partially crosslinked diene rubbers which have rubber particle diameters $d_{50}$ of 0.05–1 μm and which have a "bimodal" particle size distribution. This signifies that molding compositions having substantially improved properties are obtained by combining specific coarse-particled rubbers with specific fine-particled rubbers in the form of graft polymers B). To this end, the rubber particle size distribution which is employed for the preparation of component B) must be bimodal and should have two distinct maxima. However, in order to obtain the effect associated with these specific particle size distributions it is necessary to use as starting materials rubbers having a particle size distribution which obeys specific parameters:

These include a critical width of the distribution curve (expressed by the quotient Q); and a critical spacing between the distribution curve maxima (expressed by the difference $d_{10}$ (b) − $d_{90}$ (a)).

The molding compositions according to the invention are distinguished by the fact that, depending on the modifier content, they retain tough fracture properties down to −20° C. and in some cases down to −30° C. and that a decrease in the toughness characteristics occurs only below this temperature.

The effect of the mixture of different polydienes is surprising since, in general, fine-particled graft rubbers improve the impact strength parameters of polyoxymethylene under multiaxial stress only to a moderate extent and coarse-particled graft rubbers lead to a continuous deterioration in the toughness parameters as the temperatures fall.

The synergistic effect which occurs was not foreseeable because the known ABS plastics, which contain coarse-particled and fine-particled graft rubbers alongside one another (cf., for example, DE-B 2 420 358), exhibit a continuous decrease in toughness with falling temperature and this was actually also to be expected for polyoxymethylenes.

An essential characteristic of the mixtures according to the invention is the content of component B), that is to say the rubber-elastic graft copolymers, of which the amount used has already been mentioned.

According to the invention, component B) comprises particles which predominantly, preferably to the extent of more than 70%, have a core-and-shell structure. The core is formed by a rubber-elastic polymer phase, onto which the hard shell, which can consist of several shells, is grafted. According to a further characteristic of the invention, the core should preferably be single-phase, which signifies that it is composed predominantly, and preferably completely, of the rubber-elastic soft phase and contains inclusions of hard polymer constituents from the shell to only a small degree and preferably not at all. In general, the core makes up 40 to 95% by weight, preferably 60 to 90% and in particular 70 to 80%, of the particles of component B); accordingly, the proportion of the shell (shells) is 5 to 60% by weight, preferably 10 to 40% by weight and in particular 20 to 30% by weight.

In the case of component B), the core comprises polymers based on polydienes, such as polybutadiene or polyisoprene. The core polymer can optionally contain up to 30% by weight, preferably up to 15% by weight and in particular up to 5% by weight of comonomer units. The comonomers are preferably other ethylenically unsaturated monomers, for example styrene, acrylonitrile or esters of acrylic or methacrylic acid with monohydric $C_1$-$C_4$-alcohols, such as methyl acrylate, ethyl acrylate, butyl acrylate or the corresponding methacrylates. The core polymer is at least partially crosslinked, the proportion of gel (in toluene) being generally ≥70% and preferably ≥80%, in particular ≥90%. The gel content of the diene rubbers is determined at 25° C. in toluene (M. Hoffmann, H. Krömer and R. Kuhn, Polymeranalytik I und II (Polymer Analysis I and II), Georg Thieme-Verlag, Stuttgart 1977). A suitable cross-linking agent is, for example, divinylbenzene.

The shell of the particles of component B) comprises so-called rigid polymers which are grafted onto the core, i.e. the graft substrate. The shell can be a single or multiple shell, the various shells in the case of multiple shells generally comprising different polymers or copolymers.

Monomers which lead to suitable polymers of the particle shell are methacrylonitrile, acrylonitrile, methacrylates in which the alcohol component has 1 to 4 carbon atoms, such as methyl methacrylate, and acrylates which are derived from alcohols having 1 to 6 carbon atoms, such as ethyl acrylate, propyl acrylate or n-butyl acrylate. Copolymers of these monomers or copolymers of one or more of these monomers with styrene, α-methylstyrene or vinyltoluene are suitable for building up the shell. Mixtures of 20 to 80% by weight of acrylonitrile or methacrylonitrile with 80 to 20% by weight of the said acrylates, methacrylates or vinyl compounds have proved particularly suitable. Further graft polymers preferred as component B) are those in which the shell is built up of two shells, the first shell being composed of polystyrene and the second (outer shell) of poly(meth)acrylate, which can be uncrosslinked or—preferably—partially crosslinked. Crosslinking monomers which can be used are multifunctional monomers such as, for example, ethylene glycol dimethacrylate or butylene glycol dimethacrylate or triallyl cyanurate.

The glass transition temperature of the above-described polydienes of component B) according to the invention should appropriately lie in the range from −40° C. to −120° C., preferably below −60° C. and in particular between −80° C. and −120° C.

The method of preparation of the graft copolymers having a core-and-shell structure, which are used according to the invention as component B), is known and is carried out either by one-stage polymerization in the case of a single shell or by multistage polymerization in the case of multiple shells. The latter procedure is described, for example, in U.S. Pat. No. 3,985,704. In both cases, the graft copolymerization is carried out by means of water-soluble initiators or by means of activated initiators or by means of activated initiator systems, one component (activator) of which at least is water-soluble (in this context cf. C. B. Bucknall, "Toughened Plastics", page 98, Applied Science Publishers Ltd., 1977, London).

Both in the case of the single stage graft polymerization and in the case of the multistage graft polymerization, the starting materials are polydienes which are in the form of aqueous latices having an average particle size $d_{50}$ in the range from 0.05 to 1 μm and which are at least partially crosslinked.

The indicated average particle sizes are in all cases the weight-average of the particle size as determined with the aid of an analytical ultracentrifuge in accordance with the method of W. Scholtan and H. Lange, Kolloid-Z. und Z.-Polymere 250 (1972), pages 782 to 796. The ultracentrifuge measurement gives the integral mass distribution of the particle diameter of a sample. The percentage by weight of the particles which have a diameter equal to or smaller than a certain size can be taken from this. The average particle diameter, which is also designated the $d_{50}$ value of the integral mass distribution, is defined as the particle diameter at which 50% by weight of the particles have a diameter equal to or smaller than the diameter which corresponds to the $d_{50}$ value. In addition to the $d_{50}$ value (average particle diameter), the $d_{10}$ and $d_{90}$ values which are obtained from the integral mass distribution are used to characterize the width of the particle size distribution of the rubber particles. The $d_{10}$ and $d_{90}$ values of the integral mass distribution are defined in the same way as the $d_{50}$ value except that they relate to 10 and 90% by weight respectively of the particles. The quotient $$\frac{d_{90} - d_{10}}{d_{50}} = Q$$

is a criterion for the distribution range of the particle size.

The difference $d_{10}$ (b) − $d_{90}$ (a) is then a criterion for the overlap of the curves: if the difference is positive, there is no or only a slight curve overlap; if the difference is negative, a curve overlap exists, the extent of which is described by the magnitude of the negative value.

It could be presumed from the fact that the rubber particles in the molding compositions are in the grafted state that the rubber particle size has been changed as a result of grafting, compared with the rubber particles present in the rubber latices (for the preparation of B). However, it has been found that the grafting and the graft shell amount in accordance with the characteristics described here have virtually no influence on the rubber particle size, so that distribution curves determined for molding compositions can be compared and equated with distribution curves determined for latex.

Rubbers having the indicated particle diameters can be obtained by emulsion polymerization of suitable monomers. In the emulsion polymerization processes known for this purpose the latex particle diameters can be adjusted by selection of the process conditions, for example by means of the nature and concentration of the emulsifier, particle agglomeration, electrolytes, temperature and monomer/polymer concentration.

For preparation of the component B), the monomers or monomer mixtures are polymerized in the presence of the polydiene latices, a predominant proportion of the monomers being grafted onto the polydiene particles. The amount of polydiene is in general 40 to 95% by weight and the amount of the monomer (mixture) 5 to 60% by weight, in each case based on the total amount. The degree of grafting achieved varies between 60 and 95% and preferably between 80 and 90%. The graft polymerization is carried out in solution or emulsion, preferably in aqueous dispersion. To this end, the finely divided polydiene latices are initially introduced with the addition of the customary polymerization aids, such as emulsifying or suspending aids, free radical initiators, regulators and the like, the monomer or the monomer mixture is added and the resulting mixture is polymerized at temperatures between 30° and 95° C., preferably at from 50° to 80° C. In the case of a single stage reaction it is expedient to use a water-soluble initiator, for example water-soluble peroxides, percarbonates or perborates. In the case of a multicomponent initiator system (redox system), at least one component must be water-soluble. Examples of emulsifiers (dispersing agents) are aliphatic and aromatic sulfates and sulfonates and also salts of aromatic or hydroaromatic carboxylic acids.

In the case of a multistage reaction, which is preferred according to the invention, the graft polymerization and the working up are carried out as described in U.S. Pat. No. 3,985,704. With this procedure, in order to form a multiple shell, one monomer, for example styrene, is first grafted onto the core polymer, for example a butadiene/styrene copolymer, and another monomer or monomer mixture is then grafted on, grafting being carried out in the presence of a crosslinking agent if appropriate.

The "bimodal" graft products B) can be prepared by various processes. Thus, it is possible to graft monomers onto a dispersion of finely divided rubber particles (corresponding to a), then to blend this graft polymer emulsion with a separately produced graft polymer dispersion of coarse-particled rubber particles (corresponding to b) and then to work up this mixture.

It is also possible to mix the dispersion of rubber particles (latices) and to graft-polymerize the graft monomers onto this mixture, in particular in aqueous emulsion using systems forming free radicals, and then to work up the product in the known manner.

Both in the case of the processes involving separate grafting and common working up of the graft product and in the case of the separate preparation of fine-particled and coarse-particled graft product it is possible to obtain graft products having a different structure of the fine-particled and the coarse-particled component.

According to a preferred process, the mixtures of rubber dispersions having the bimodal particle distribution according to the invention are grafted with graft monomers, in particular in aqueous emulsion by means of systems forming free radicals, and then worked up in the known manner, for example by spray-drying.

However, it is also possible separately to prepare fine-particled graft rubbers and coarse-particled graft rubbers and to blend these in amounts corresponding to the compositions a/b according to the invention with the thermoplastic polyoxymethylenes in order to produce the molding compositions according to the invention.

According to the invention, the base polymers (component A) used are the known polyoxymethylenes such as are described, for example, in DE-A 2 947 490. These are essentially unbranched linear polymers which as a rule contain at least 80% and preferably 90% of oxymethylene units (—CH₂O—). The term polyoxymethylenes comprises both homopolymers of formaldehyde or its cyclic oligomers such as trioxane or tetroxane and corresponding copolymers.

Homopolymers of formaldehyde or trioxane are those polymers in which the hydroxyl end groups have been chemically stabilized against degradation in a known manner, for example by esterification or etherification.

Copolymers are polymers of formaldehyde or its cyclic oligomers, in particular trioxane, and cyclic ethers, cyclic acetals and/or linear polyacetals.

Suitable comonomers are α) cyclic ethers having 3, 4 or 5, preferably 3, ring members, β) cyclic acetals other than trioxane having 5 to 11, preferably 5, 6, 7 or 8, ring members and γ) linear polyacetals, in each case in amounts of 0.1 to 20 and preferably 0.5 to 10% by weight. Copolymers composed of 95 to 99.5% by weight of trioxane and 0.5 to 5% by weight of one of the abovementioned cocomponents are most suitable.

The values for the reduced specific viscosity (RSV values) of the polyoxymethylene are in general 0.3 to 2.0 dl.g$^{-1}$ and preferably 0.5 to 1.5 dl.g$^{-1}$ (measured in butyrolactone stabilized with 2% by weight of diphenylamine at 140° C. in a concentration of 0.5 g/100 ml). The melt flow index values MFI 190/2.16 are usually between 0.02 and 50 g.min$^{-1}$ (DIN 53 735). The crystal melting point of the polyoxymethylene is in the range from 140° to 180° C. and preferably 150° to 170° C.; its density is 1.38 to 1.45 g.ml$^{-1}$ and preferably 1.40 to 1.43 g.ml$^{-1}$ (DIN 53 479).

The mixture according to the invention can optionally contain additives, such as stabilizers, nucleating agents, antistatic agents, light stabilizers and flameproofing agents, slip agents and lubricants, plasticizers, pigments, dyes, fluorescent brighteners, processing auxiliaries and the like, the amount of which can be up to 50% by weight, based on the total mixture.

Suitable compounds for stabilizing the polyacetal phase against the influence of heat are, in particular, polyamides, amides of polybasic carboxylic acids, amidines, for example dicyandiamide, hydrazines, ureas, poly(N-vinyllactams) and alkaline earth metal salts of aliphatic monobasic to tribasic carboxylic acids having 2 to 20 carbon atoms and preferably containing hydroxyl groups, for example calcium stearate, calcium ricinoleate, calcium lactate and calcium citrate. Oxidation stabilizers used are, in particular, biphenol compounds, preferably diesters of monobasic 4-hydroxyphenylalkanoic acids which contain 7 to 13 and preferably 7, 8 or 9 carbon atoms. In each case it is advantageous to add sulfur-containing costabilizers, such as β,β'-thiodi(propionic acid lauryl ester), in addition to the customary diphenol compounds, to provide increased protection against oxidative attack on the graft copolymers (component B). Diphenylamine-based or naphthylamine-based systems have also proved to be outstanding oxidation stabilizers. Phenolic antioxidants are also suitable for stabilization of component B) (BE-A 853 844 or EP-A 0 044 159).

Suitable light stabilizers are, for example, α-hydroxybenzophenone derivatives and benzotriazole derivatives.

The stabilizers are in general usually employed in an amount of in total 0.1 to 5, and preferably 0.5 to 3, % by weight (based on the total molding composition).

Furthermore, the mixture according to the invention can also contain customary fillers, for example fibrous reinforcing materials, such as glass fibers or carbon fibers; non-fibrous fillers, such as glass powder, graphite, carbon black, metal powders, metal oxides, silicates, carbonates and molybdenum(IV) sulfide. These fillers can be provided with an adhesion promoter or adhesion promoting system. The amount of filler is up to 50% by weight and preferably 5 to 40% by weight, based on the total mixture. However, the mixture according to the invention preferably does not contain any fillers.

The mixtures according to the invention are prepared by intensive mixing of the constituents at elevated temperature, i.e. in general at temperatures above the melting point of component A, that is to say at about 160° to 250° C. and preferably between 180° and 220° C., in equipment which mixes well, such as kneaders or extruders, preferably twin-screw extruders, or on roll mills. Usually the pulverulent components are first mixed mechanically at room temperature and then melted for complete homogenization. The molding compositions according to the invention are distinguished by outstanding toughness properties. An outstanding characteristic is the ability to absorb high multiaxial deformation forces even at low temperatures.

The mixtures according to the invention can be comminuted mechanically, for example by chopping or grinding to form granules, chips, flakes or powders. They are thermoplastic and thus suitable for all processing methods typical for thermoplastic compositions. They can therefore be processed by injection molding, extrusion, melt spinning or deep drawing to give any desired moldings and are suitable as industrial material for the production of semi-finished goods and finished parts, for example strips, rods, plates, films, tubes and hoses, and also machine parts, for example casings, gearwheels, bearings and control elements, and also of car accessories, such as spoilers and the like.

EXAMPLES

The graft copolymers (component B) used in the examples were obtained by aqueous emulsion polymerization of the monomers or monomer mixtures named in Table 1 in the presence of the dispersed polybutadienes. The graft copolymers prepared in this way, which according to the invention (Examples 1 to 12) have a core-and-shell structure, were spray-dried and mixed in a twin-screw extruder in various proportions by weight with polyoxymethylenes of various melt viscosities. The temperature in the mass of the mix material was about 210° to 230° C. (casing temperature about 190° C.). The dried granules were injection molded by the customary means to give test pieces, for which the values indicated in Table 2 below (Examples 13 to 25) and Comparison Examples 1 to 3 were determined.

The materials employed were:

COMPONENT A

I: Copolymer of trioxane and about 2% by weight of ethylene oxide having a melt viscosity MFI 190/2.16 of about 9.0 g/10 min in accordance with DIN 53 735

II: Homopolymer of formaldehyde having a melt viscosity MFI 190/2.16 of about 10.0 g/10 min

COMPONENT B

III Graft rubbers

III.1 Preparation of styrene/acrylonitrile-grafted polybutadiene (ABS)

1,000 parts by weight of a mixture of the polybutadiene latices (gel content about 85%) having the average particle sizes $d_{50}=0.12$ (a) and $d_{50}=0.45$ (b) and the ratio indicated in Table 1 were initially introduced in a glass reactor under inert gas. The solids content was 30% by weight and the pH was 10.0. After heating the mixture to 70° C., 0.6 part by weight of potassium persulfate, dissolved in 20 parts by weight of water, was added. A mixture of the monomers 90 g of styrene and 38.5 g of acrylonitrile and a solution of 5 parts by weight of an emulsifier (((R))Dresinate 731, manufacturer: Hercules Inc., Wilmington Del., USA) in 80 parts by weight of water was added dropwise at a uniform rate within a period of 3 hours. The PH was monitored and kept constant at 10.0 using 1N NAOH. After all the graft monomers had run in, the temperature was raised to 80° C. and polymerization of the mixture was completed over a period of 3 hours. The resulting graft copolymers were obtained in the form of a finely divided powder by means of spray-drying.

III.2 Preparation of styrene and methyl methacrylate-grafted polybutadiene (MBS)

In accordance with the method indicated under III.1, 1,000 parts by weight of the finely dispersed polybutadiene latices a) and b) were initially introduced into a reactor under inert conditions. The pH was adjusted to 9.0 using dilute acetic acid and 10% by weight of the required amount of styrene were added. The mixture was heated to 70° C. and after adding 0.6 part by weight of potassium persulfate was kept at 70° C. for 15 minutes. After the polymerization started, the remaining styrene was added dropwise in the course of 90 minutes and after about one hour the mixture was brought to 80° C. Methyl methacrylate, to which 1% by weight of ethylene glycol dimethacrylate had been added, was metered in the course of 60 minutes and the mixture was then kept at 80° C. for about 90 minutes. The graft copolymer was obtained in the form of a finely divided powder by means of spray-drying as in Example III.1.

IV. Preparation and testing of the molding compositions

The components according to Table 2 were melted, homogenized and stabilized in a twin-shaft extruder operating continuously. The cylinder temperatures were set such that the temperatures in the mass were approximately between 210° and 230° C. The melt extrudate issuing from the extruder was cooled, granulated and dried at about 100° to 110° C. under inert gas.

The granules were injection molded by means of an injection molding machine to give test pieces and the fracture energy was tested in a penetration test with electronic detection of the measured value in accordance with DIN 53 453 at the temperatures indicated in Table 2.

Compared with systems known hitherto, the test pieces from the molding compositions according to the invention displayed substantially improved toughness parameters down to test temperatures of minus 40° C., without the originally advantageous properties of the polyoxymethylenes, for example good resistance to weathering and aging, high surface quality, excellent slip and wear characteristics or favorable thermoplastic processability, being substantially impaired as a result.

TABLE 1

| | Polybutadiene graft substrate | | Graft monomers* | | | |
|---|---|---|---|---|---|---|
| Example | $d_{50} = 0.1\%$ μm % by weight (a) | $d_{50} = 0.45$ μm % by weight (b) | S % by weight | AN % by weight | MMA % by weight | Graft shell |
| 1 | — | 70 | 21 | 9 | — | single shell |
| 2 | 70 | — | 21 | 9 | — | single shell |
| 3 | 15 | 55 | 21 | 9 | — | single shell |
| 4 | 30 | 40 | 21 | 9 | — | single shell |
| 5 | 35 | 35 | 21 | 9 | — | single shell |
| 6 | 55 | 15 | 21 | 9 | — | single shell |
| 7 | — | 70 | — | — | 30 | single shell |
| 8 | 70 | — | — | — | 30 | single shell |
| 9 | 35 | 35 | — | — | 30 | single shell |
| 10 | 30 | 40 | 5 | — | 25 | twin shell |
| 11 | 35 | 35 | 5 | — | 25 | twin shell |
| 12 | 40 | 30 | 5 | — | 25 | twin shell |

*S = styrene
AN = acrylonitrile
MMA = methyl methacrylate

TABLE 2

| | Polyoxymethylene (A) | | Graft rubber components (B) | | Average particle size μm | Multiaxial impact strength* Deterioration work J | | |
|---|---|---|---|---|---|---|---|---|
| | Type | % by weight | Type | % by weight | | 23° | −20° | −40° |
| Comparison Examples | | | | | | | | |
| 1 | Copo | 70 | ABS (DE 1964156) | 30 | 5–20[1] | 0.75 | 1.0 | 0.25 |
| 2 | Copo | 70 | ABS: Blendex (R) 27884 | 30 | 0.07–6[1] | 11.5 | 12.0 | 2.5 |
| 3 | Copo | 70 | MBS: Paraloid (R) EXL 2600 | 30 | 0.15 | 10.5 | 7.5 | 0.9 |
| Examples | | | Example | | | | | |
| 13 | Copo | 70 | 1 | 30 | 0.45 | 12.0 | 11.0 | 4.0 |
| 14 | Copo | 70 | 2 | 30 | 0.15 | 13.0 | 13.0 | 4.5 |
| 15 | Copo | 70 | 3 | 30 | 0.15/0.45 | 13.0 | 14.0 | 4.0 |
| 16 | Copo | 70 | 4 | 30 | 0.15/0.45 | 17.0 | 17.5 | 7.5 |
| 17 | Copo | 70 | 5 | 30 | 0.15/0.45 | 19.5 | 20.0 | 9.0 |
| 18 | Homo | 70 | 5 | 30 | 0.15/0.45 | 20.5 | 21.5 | 9.0 |
| 19 | Copo | 70 | 6 | 30 | 0.15/0.45 | 18.0 | 18.0 | 7.5 |
| 20 | Copo | 70 | 7 | 30 | 0.45 | 11.5 | 12.5 | 3.0 |
| 21 | Copo | 70 | 8 | 30 | 0.15 | 13.0 | 14.0 | 1.1 |
| 22 | Copo | 70 | 9 | 30 | 0.15/0.45 | 19.0 | 20.5 | 9.0 |
| 23 | Copo | 70 | 10 | 30 | 0.15/0.45 | 16.0 | 18.0 | 7.5 |
| 24 | Copo | 70 | 11 | 30 | 0.15/0.45 | 18.5 | 19.0 | 9.0 |

TABLE 2-continued

| | Polyoxymethylene (A) | | Graft rubber components (B) | | Average particle size μm | Multiaxial impact strength* Deterioration work J | | |
|---|---|---|---|---|---|---|---|---|
| | Type | % by weight | Type | % by weight | | 23° | −20° | −40° |
| 25 | Copo | 70 | 12 | 30 | 0.15/0.45 | 17.0 | 17.0 | 8.0 |

*in accordance with DIN 53 433 on 2 mm plates
[1]polydisperse

We claim:

1. A thermoplastic molding composition comprising
   A) 50 to 95% by weight of polyoxymethylene, and
   B) 5 to 50% by weight of a rubber-elastic graft copolymer having bimodal particle size distribution,
   in each case based on the sum of the components A) and B), and optionally additives, wherein component B) comprises
   1) a rubber-elastic, at least partially crosslinked core based on at least one polydiene having particle diameters of 0.05 to 1 μm, based on the following rubbers:
      a) 15-85% by weight (based on the sum of a+b) of a rubber latex having an average particle diameter $d_{50}$ of 0.05-0.2 μm, and
      b) 85-15% by weight (based on the sum of a+b) of a rubber latex having an average particle diameter of $d_{50}$ of 0.2-1 μm, with the proviso that
         i) the particle diameter $d_{50}$ (rubber b) is larger than the particle diameter $d_{50}$ (rubber a) by a factor of 1.5-8,
         ii) the quotient $Q=(d_{90}-d_{10})/d_{50}$ of the particular rubbers is at most 2 and
         iii) the difference $d_{10}(b)-d_{90}(a)$ is 0.01 to minus 0.10, and
   2) at least one hard graft shell comprising at least one vinyl monomer selected from the group comprising styrene, (meth)acrylonitrile, (meth)acrylate and vinyltoluene.

2. Thermoplastic molding composition as claimed in claim 1, wherein said additives are selected from the group consisting of stabilizers, nucleating agents, antistatic agents, light stabilizers, flame-proofing agents, slip agents, lubricants, plasticizers, pigments, dyes, fluorescent brighteners and processing auxiliaries.

3. A molding composition as claimed in claim 1, wherein 35-60% by weight (based on the sum of a+b) of a rubber latex having an average particle diameter $d_{50}$ of 0.08-0.15 μm.

4. A thermoplastic molding composition as claimed in claim 1, wherein 65-35% by weight (based on the sum of a+b) of a rubber latex having an average particle diameter $d_{50}$ of 0.3-0.6 μm, with the proviso that $d_{50}$ of (b) is larger than $d_{50}$ of (a) by a factor of 3-4.5.

5. A thermoplastic molding composition as claimed in claim 1, wherein the quotient $Q=(d_{90}-d_{10})/d_{50}$ of the particular rubbers is at most 0.8 and the difference $d_{10}(b)-d_{90}(a)$ is 0 to minus 0.05.

6. A molding composition as claimed in claim 1, wherein the component B) predominantly has a core-and-shell structure.

7. A molding composition as claimed in claim 6, wherein component B) has a core-and-shell structure to the extent of more than 70%.

8. A molding composition as claimed in claim 1, wherein the core is single-phase.

9. A molding composition as claimed in claim 1, wherein the core makes up 40-95% by weight of the particles of component B) and the shell proportion is 5 to 60% by weight.

10. A molding composition as claimed in claim 1, wherein the graft copolymer has a gel content of greater than or equal to 70%.

11. A molding composition as claimed in claim 1, wherein the polydiene employed is polybutadiene or polyisoprene, which optionally contains up to 30% by weight of other comonomer units.

12. A molding composition as claimed in claim 1, wherein the polydiene rubbers have a glass transition temperature in the range from minus 40° to minus 120° C.

13. A molding composition as claimed in claim 1, wherein the rubber content of the graft products is between 50 and 85% by weight.

14. A molding composition as claimed in claim 1, wherein the graft shell(s) is or are composed of
   a) polymethyl methacrylate or
   b) polymers of mixture of 20 to 80% by weight of acrylonitrile or methacrylonitrile with 80 to 20% by weight of acrylates wherein said acrylates are derived from alcohols having from 1 to 6 carbon atoms, methacrylates wherein said methacrylates are derived from alcohols having from 1 to 4 carbon atoms or styrene,
or a mixtures thereof of a and b.

15. A molding composition as claimed in claim 1, wherein the graft shell of component B) is formed as a single shell and is composed of polymers of styrene/acrylonitrile or methyl methacrylate.

16. A molding composition as claimed in claim 1, wherein the graft shell is formed of two or more shells, the inner shell is composed of polystyrene (crosslinked) and the outer shells are composed of polymers of styrene/methyl methacrylate or methyl methacrylate (crosslinked).

17. A molding composition as claimed in claim 1, wherein the graft product B) has been prepared by mixing a rubber latex a and a rubber latex b and subsequent graft polymerization with the vinyl monomers.

18. A molding composition as claimed in claim 1, which contains oxidation stabilizers as additives.

19. A molding produced from the molding composition as claimed in claim 1.

20. The molding as claimed in claim 19, in the form of rods, plates, films, tubes, machine parts and car accessories.

* * * * *

UNITED STATES PATENT AND TRADEMARK OFFICE
CERTIFICATE OF CORRECTION

PATENT NO. : 5,256,733
DATED : Oct. 26, 1993
INVENTOR(S) : Fleischer et al

It is certified that error appears in the above-indentified patent and that said Letters Patent is hereby corrected as shown below:

In claim 2, column 11, line 47, please delete the phrase "light stabilizers,".

In claim 3, column 11, line 51, after the word "wherein", please insert the phrase --component 1a) in B)--.

In claim 4, column 11, line 55, after the word "wherein", please insert the phrase --component 1b) of B)--.

Signed and Sealed this

Fifth Day of July, 1994

*Attest:*

BRUCE LEHMAN

*Attesting Officer*  *Commissioner of Patents and Trademarks*